April 27, 1965         R. L. CUNNINGHAM ETAL         3,180,987
ION BOMBARDMENT CAMERA FOR CRYSTAL ORIENTATION DETERMINATION
Filed June 20, 1963
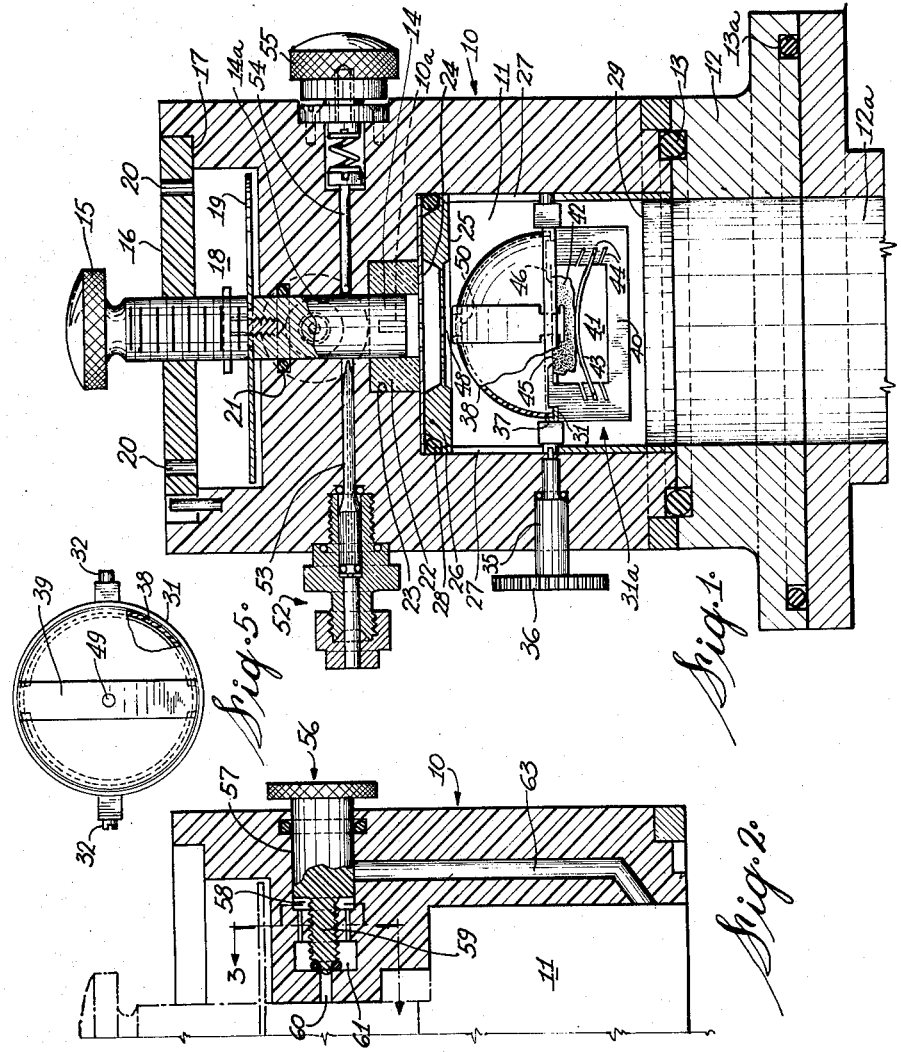
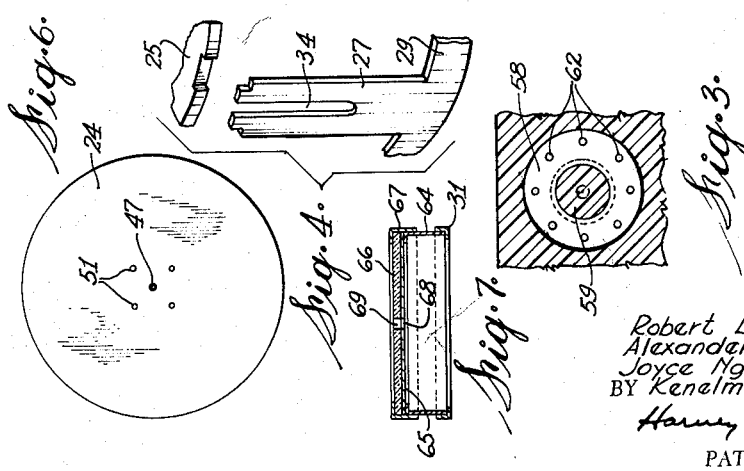
INVENTOR
Robert L. Cunningham
Alexander V. Grant.
Joyce Ng-Yelim.
BY Kenelm V. Gow.
Harvey J. Marshall
PATENT AGENT United States Patent Office 3,180,987
Patented Apr. 27, 1965

3,180,987
ION BOMBARDMENT CAMERA FOR CRYSTAL
ORIENTATION DETERMINATION
Robert L. Cunningham, Alexander V. Grant, and Joyce Ng-Yelim, Ottawa, Ontario, Canada, and Kenelm V. Gow, Pett, near Hastings, Sussex, England, assignors to Her Majesty the Queen in right of Canada as represented by the Minister of Mines and Technical Surveys
Filed June 20, 1963, Ser. No. 289,329
8 Claims. (Cl. 250—49.5)

This invention relates to an ion bombardment camera for the determination of the orientation of crystal lattices in a crystalline sample.

The determination of crystal orientation in crystalline substances has, in the past, usually been effected by the employment of either one of two general techniques, namely; (a) the use of X-ray methods which are based on electromagnetic diffraction, and (b) the etch pit method based on optical reflection. X-ray film methods require expensive apparatus, exposure is relatively long, and developing, washing, fixing and drying is very time-consuming. X-ray diffractometer measurements require even more expensive apparatus and, if the orientation is entirely unknown, can be very time-consuming. Both require skilled professional staff to interpret the results.

It is an object of this invention to provide a device for determining crystal orientation which is of simple, low cost manufacture, which produces results sufficiently accurate for most purposes, and which achieves such results much faster than existing techniques.

The present invention relates to an apparatus for the determination of the orientation of crystal lattices by the bombardment, in vacuum, of a crystalline sample with accelerated ions under such conditions that atoms are ejected from the crystal in known crystallographic directions and are deposited on a collector or other suitable type of detector.

The physical principle upon which the present technique is based is that of momentum transfer along certain directions in the crystal lattice and the subsequent ejection of atoms by impact directed outwardly through any of the surfaces.

An inherent advantage of the device of the present invention resides in the fact that ejection directions, and, therefore, directions of the crystal lattice, can be directly recorded whereas X-ray diffraction and surface reflection methods record diffraction and reflection from planes, respectively, and this data is then used to calculate directions. In the present invention, flat collector plates permit the direct production within the equipment of gnomonic patterns, while hemispherical collectors permit the production of stereographic patterns on a flat plate by a simple optical projection technique. The use of either type of pattern permits the direct reading of crystal orientation by comparison with standard diagram and since (a) no calculations are required, (b) no film processing is required, and (c) the exposure times are much less than that needed to produce a conventional X-ray pattern, the period required for a determination by use of the device of the present invention is greatly reduced.

One form of apparatus in accordance with the invention will now be described with particular reference to the accompanying drawings, in which FIGURE 1 is a sectional elevation of an ion bombardment camera, FIGURE 2 is a partial sectional elevation of the camera from a different direction, FIGURE 3 is a section on line 3—3 of FIGURE 2, FIGURE 4 is a perspective view of a portion of the cathode supporting means, FIGURE 5 is a partial plan view of the collector and specimen holder, FIGURE 6 is a plan view of the cathode disc, and FIGURE 7 is a partial side elevation of a modified type of collector holder.

In the drawing, 10 is a generally cylindrical body formed of rigid transparent material, which may be glass or a plastic composition such as those known under the trademarks "Lucite" and "Plexiglas." The body is adapted to be arranged in upright position and has a cylindrical chamber 11 axially disposed therein adjoining the bottom end which is connected to a suitable vacuum system through a pipe 12a in a member 12. Sealing means, such as O-ring 13 and 13a, are provided to maintain the chamber in vacuum-tight condition.

An ion source of the glow discharge type comprising a cylindrical metal anode 14, made hollow at the discharge end by an axial hole 14a, is adjustably mounted for focussing in a cylindrical hole 10a in the body 10 in axial relation to the chamber 11. As shown, a cap member 15 of insulating material is fixed to the upper end of the anode, the cap member having a screw-threaded mounting in a cover disc 16 which sits on a shoulder 17 at the upper end of the body. The disc 16 overlies a recess 18 in which may be positioned a cooling disc 19 carried by the anode structure and designed to dissipate heat to the atmosphere through a plurality of openings 20 in the disc 16. The anode is provided with a vacuum sealing ring 21. The lower end portion of the anode extends through a bushing 22, which may be glass, seated in a complementary recess 23 in the body. It will be apparent that the anode 14 may be axially adjusted by turning the cap member 15 in the desired direction.

The cathode comprises a thin metal disc 24, which may have a thickness of the order of $10/1000$ inch, positioned at the top of chamber 11 as by means of a circular metal plate 25 having an annular rib 26 engaging the cathode disc and pressing it against the opposed surface of the top wall of the chamber. The rib 26 also acts as a sealing means in association with an O-ring 28 which it presses against the side wall of the chamber. Plate 25 is supported by means of a pair of opposed posts 27 disposed at the side wall of the chamber. The lower ends of the posts are integral with a ring 29 seated on base member 12.

Means for supporting a collector and a crystalline sample comprises a holder 31a including a ring 31 mounted for tilting movement about a horizontal axis defined by pins 32 fixed to the ring and rotatably seated in posts 27. As shown, the posts are slotted at 34 to permit ease of assembly. Means for tilting the ring may comprise a spindle 35 fixed to one pin 32 and journalled in body 10. A turning disc 36 is fixed to the outer end of spindle 35.

Ring 31 has an upright peripheral flange 37 for accurate positioning thereon of a hemispherical collector 38. The hemispherical collector may be formed of thin plastic material. The collector 38 is releasably supported on the ring as by means of an arcuate band 39 having its ends anchored in the ring.

Suspended from ring 31 is a sample holder 40 having a recess 41 therein to receive a sample 42. The sample is releasably positioned in the holder by means of a spring 43 in the recess and having its ends selectively positioned in pairs of slots 44. As shown, the upper face 45 of the crystal bears upon overhanging lips 46 of the holder. It will be apparent that such upper face 45, in the modification illustrated, lies in the diametral plane of the edge of collector 25.

Passage of ions onto the face 45 of the crystal is permitted by a central pin hole 47, the diameter of which may be of the order of $15/1000$ inch, in the cathode disc 24, a hole 48 in plate 25, a hole 49 in band 39, and a hole 50 in the collector. If desired, the cathode disc 24 may be provided with a plurality of secondary holes 51, which may be of slightly smaller diameter than that of hole 47, disposed around the central hole. The four holes 51 shown are uniformly spaced about the circumference of a circle concentric with hole 47.

Means for feeding an inert gas at controlled pressure into the source comprises a fitting 52 mounted in the body and adapted to be connected to a source of gas. The fitting contains a capillary tube 53 communicating with the anode recess.

The power connection for the anode comprises a spring-urged contact 54 mounted in the body and a connector cap 55.

As previously indicated, the inert gas, such as argon, is fed into the ion source and later passes into the bombardment chamber 11 along with some of its ions. The pressure in the source must be held in the range necessary to sustain the glow discharge and, in the bombardment chamber, must be held at a pressure sufficiently low to keep the mean free path of the atoms ejected from the specimen target face 45 (under the ion bombardment thereof) considerably greater than the distance from such face 45 to the collector 38 in order to reduce the background due to scattering. This pressure control can be achieved by rapid pumping of the bombardment chamber as this, in turn, creates a pressure drop along the cathode holes by the passage of the gas. When the gas leaves the glow discharge region at the same rate as it enters through the capillary, steady state operation is reached. This condition can be more rapidly attained by providing a by-pass valve 56 around the cathode which permits rapid adjustment of pressure at the beginning of a bombardment.

Because the input and output of the source must pass through very fine holes, this valve 56, when opened fully, also ensures that unwanted atmospheric gases are removed from the source before bombardment is started. Being variable, the valve is also a useful control of the output of the ion source. Valve 56 comprises a plug 57 reciprocally mounted in a valve chamber 58 as by means of a screw-threaded extension 59 on the plug. The end of extension 59 is adapted to sealingly engage the mouth of a passage 60 leading to the source. It will be observed that the mouth of passage 60 may be opened by actuating the valve to place it in communication with a recess 61 which, in turn, is in communication with valve chamber 58 through a plurality of openings 62. Opening of the valve also places chamber 58 in communication with bombardment chamber 11 through a passage 63.

The holder 31a ensures a fixed relative position of the specimen in relation to the collector and permits the specimen to be oriented with its surface at any desired angle to the beam or to be turned to the best position for inspection of the developing pattern to attain maximum contrast. The holding band 39, pierced with a hole to permit bombardment at the desired angle, also serves to protect the back of the collector from damage from the ion beam when the holder is turned into inspection position. Usually, satisfactory patterns are obtained by bombardment at approximately right angles to the surface. However, if it is desired to have a group of equivalent spots register with a uniform intensity, the specimen and collector may be positioned so as to achieve this result.

It will be observed that both the cathode and the specimen are held at the same potential, i.e., both are connected to ground through posts 27, ring 29, and base 12, which is grounded in conventional manner. Thus, the region between the two is free of any significant fields and the straight paths of the ions remain unaffected by tilting of the specimen to any chosen angle for bombardment.

From the foregoing description, it will be appreciated that significant features of the apparatus described comprise (a) separation of the cathode and the specimen to be bombarded, (b) the provision of a conductor connecting specimen and cathode to hold them at the same potential, and (c) mounting of the specimen and collector for tilting movement in various directions for bombardment and viewing of results. Thus, bombardment from many angles other than perpendicular is possible simply by tilting of the target. As the target is separated from the cathode and connected within by a conductor, no changes in lines of force are created by the tipping to interfere with and change the direction of the bombarding ions.

Since all points on the surface of the hemispherical collector are equidistant from the target, accurate and well-defined patterns are produced thereon. Moreover, the collector surface may be inspected as desired at frequent intervals by tilting the same into viewing position, the transparency of the body enabling such surface to be viewed. In the modification shown, the body is formed of a transparent, insulating material for convenience of construction. It will be apparent that such body may be opaque with a transparent portion providing a viewing window for inspection. It will also be apparent that, if the body or frame of the instrument is not of insulating material, suitable insulation may be provided for the electrical elements thereof.

FIGURE 7 illustrates the mounting of a flat collector plate in the device. An annulus 64 is positioned on the ring 31 and carries a circular collector disc 65 surmounted by a glass disc 66 and held in position on the annulus by a circular flanged member 67. The disc 66 has a central hole 68 registering with a central hole 69 in the collector 65, for passage of the ion beam. The collector 65 may be formed of glossy paper.

We claim:

1. An ion bombardment camera for the determination of crystal lattice orientation by the bombardment of the crystalline sample with ions to cause the ejection of atoms from the crystal in known crystallographic directions due to the momentum transfer between atoms along certain directions in the crystal lattice, which camera comprises a body having a chamber therein, an ion source of glow discharge type for producing an ion beam including an anode mounted in said body, said body having an inert gas passage leading to said anode, a cathode disc mounted in said chamber in alignment with the axis of the ion beam, said anode and said cathode disc having confronting faces, a crystalline specimen holder in said chamber tiltably mounted in said body about an axis normal to and intersecting the axis of the ion beam and having a specimen receiving recess, a specimen support carried by said holder, a collector on which the ejected specimen atoms are deposited being removably mounted on said holder and located between said cathode disc and said specimen recess, means connecting said anode to a source of electrical energy, a conductor electrically connecting said cathode disc and said specimen support whereby said cathode disc and specimen support are at the same potential, said cathode disc and said collector each having an opening therein in alignment with the axis of the ion beam to provide an uninterrupted path for ion bombardment from said anode to said specimen recess, and means for connecting said chamber to a vacuum system.

2. An ion bombardment camera as defined in claim 1, said body being substantially transparent to permit viewing therethrough of said collector.

3. An ion bombardment camera as defined in claim 1, said anode being axially movable in said body, and means for adjusting the axial position of said anode in said body.

4. An ion bombardment camera as defined in claim 1, said body having a recess through which said anode extends, a closure plate for said recess, and a heat-dissipating shield carried by said anode in said recess, said closure plate having heat-dissipating openings therein.

5. An ion bombardment camera as defined in claim 1, said anode being cylindrical and being axially reciprocally mounted in said body, said anode having a cap member of insulating material secured thereto, said body having a portion screw-threadedly receiving said cap member for axial adjustment of said anode.

6. An ion bombardment camera as defined in claim 1, said anode being cylindrical and being axially reciprocally mounted in said body, said anode having a cap member of insulating material secured thereto, said body having a recess through which said cap member extends and a closure plate for said recess, said cap member being screw-threadedly mounted in said closure plate for axial adjustment of said anode, and a heat-dissipating shield carried by said anode in said recess, said closure plate having heat dissipating openings therein.

7. An ion bombardment camera as defined in claim 1, said collector being hemispherical.

8. An ion bombardment camera as defined in claim 1, said collector being a flat plate.

References Cited by the Examiner

UNITED STATES PATENTS

| | | | |
|---|---|---|---|
| 2,258,149 | 10/41 | Schutze | 250—49.5 |
| 2,261,569 | 11/41 | Schutze | 250—49.5 |
| 2,319,350 | 5/43 | Schiebold | 250—51.5 |
| 2,457,555 | 12/48 | Haworth | 250—51.5 |
| 2,500,948 | 3/50 | Kaiser et al. | 250—51.5 |
| 2,506,080 | 5/50 | Gross | 250—49.5 |
| 2,745,966 | 5/56 | Verhoeff | 250—49.5 |
| 2,904,688 | 9/59 | Miller | 250—51.5 |
| 2,967,240 | 1/61 | Koch | 250—49.5 |
| 3,086,112 | 4/63 | Riecke | 250—51.5 |

RALPH G. NILSON, *Primary Examiner.*